(12) United States Patent
Takeishi

(10) Patent No.: US 11,694,458 B2
(45) Date of Patent: Jul. 4, 2023

(54) IMAGE PROCESSING APPARATUS THAT SETS METADATA OF IMAGE DATA, METHOD OF CONTROLLING SAME, AND STORAGE MEDIUM

(71) Applicant: CANON KABUSHIKI KAISHA, Tokyo (JP)

(72) Inventor: Hiroki Takeishi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 425 days.

(21) Appl. No.: 16/896,527

(22) Filed: Jun. 9, 2020

(65) Prior Publication Data
US 2020/0394432 A1    Dec. 17, 2020

(30) Foreign Application Priority Data

Jun. 12, 2019 (JP) .................. 2019-109609

(51) Int. Cl.
| | |
|---|---|
| *G06V 30/412* | (2022.01) |
| *G06F 18/22* | (2023.01) |
| *G06V 30/196* | (2022.01) |
| *G06V 30/10* | (2022.01) |

(52) U.S. Cl.
CPC ............ *G06V 30/412* (2022.01); *G06F 18/22* (2023.01); *G06V 30/1985* (2022.01); *G06V 30/10* (2022.01)

(58) Field of Classification Search
CPC ....... G06V 10/40; G06V 30/10; G06K 9/6201
See application file for complete search history.

(56) References Cited

U.S. PATENT DOCUMENTS

| | | | | |
|---|---|---|---|---|
| 5,742,705 | A * | 4/1998 | Parthasarathy | .... G06V 30/1801 382/187 |
| 8,162,125 | B1 * | 4/2012 | Csulits | ................... G07D 11/50 194/207 |
| 9,881,225 | B2 | 1/2018 | Kodimer | |
| 2003/0059115 | A1 * | 3/2003 | Nakagawa | ........... G06V 30/242 382/197 |
| 2005/0289182 | A1 * | 12/2005 | Pandian | ................. G06Q 10/10 |
| 2011/0004336 | A1 * | 1/2011 | Numata | ................... G07D 7/04 700/219 |
| 2011/0202545 | A1 * | 8/2011 | Kawai | ............... G06F 16/24564 707/755 |
| 2015/0149952 | A1 * | 5/2015 | Baheti | ................. G06F 3/04883 715/780 |
| 2015/0373224 | A1 * | 12/2015 | Kusakabe | .......... H04N 1/32128 358/1.15 |

(Continued)

FOREIGN PATENT DOCUMENTS

JP    2017194953 A    10/2017

*Primary Examiner* — Edward Park
(74) *Attorney, Agent, or Firm* — Rossi, Kimms & McDowell LLP

(57) ABSTRACT

An image processing apparatus that enables easy setting of metadata of image data. The image processing apparatus obtains image data associated with a selected work. A key candidate is identified from t image data based on one or more key types defined according to the selected work. A value candidate corresponding to the identified key candidate is identified based on a value type rule and a value search area rule which are defined for each of the one or more key types, and the identified value candidate is set as the metadata of the image data.

5 Claims, 14 Drawing Sheets

(56) References Cited

U.S. PATENT DOCUMENTS

| | | | |
|---|---|---|---|
| 2016/0379183 A1* | 12/2016 | Holman | G06Q 20/08 |
| | | | 705/44 |
| 2020/0394432 A1* | 12/2020 | Takeishi | G06V 30/1985 |
| 2022/0051409 A1* | 2/2022 | Maclellan | G16H 20/00 |
| 2022/0301379 A1* | 9/2022 | Yamamoto | B65H 31/22 |

* cited by examiner

FIG. 8A

| ASSOCIATED KEY | KEY CANDIDATE-IDENTIFYING CHARACTER STRING | SEARCH RULE |
|---|---|---|
| CHARGED AMOUNT | TOTAL AMOUNT | AMOUNT |
| | SUM | AMOUNT |
| | CHARGED AMOUNT | AMOUNT |
| SUM | TOTAL AMOUNT | AMOUNT |
| | SUM | AMOUNT |
| | CHARGED AMOUNT | AMOUNT |
| SUBTOTAL | SUBTOTAL | AMOUNT |
| POSTAL ADDRESS | BILLER | POSTAL ADDRESS |
| | DESTINATION | POSTAL ADDRESS |
| | POSTAL ADDRESS | POSTAL ADDRESS |
| | 〒 | POSTAL ADDRESS |
| NAME | NAME | NAME |
| | PERSON IN CHARGE | NAME |
| | TO | NAME |
| | NAME | NAME |
| BILLER | | BILLER |
| | | BILLER |
| TELEPHONE | TELEPHONE | TELEPHONE NUMBER |
| | TEL | TELEPHONE NUMBER |

| SEARCH RULE | VALUE PHYSICAL SEARCH RULE |
|---|---|
| AMOUNT | L: 0 cm, R: 10 cm, T: 0 cm, B: 2 cm |
| POSTAL ADDRESS | L: 0 cm, R: 10 cm, T: 0 cm, B: 5 cm |
| NAME | L: 0 cm, R: 10 cm, T: 0 cm, B: 5 cm |
| TELEPHONE NUMBER | L: 0 cm, R: 10 cm, T: 0 cm, B: 2 cm |
| REFERENCE NUMBER | L: 0 cm, R: 10 cm, T: 0 cm, B: 2 cm |
| BILLER | L: 10 cm, R: 0 cm, T: 10 cm, B: 0 cm |

| SEARCH RULE | VALUE TYPE RULE |
|---|---|
| AMOUNT | -?¥¥?((¥d+), ?)+yen? |
| POSTAL ADDRESS | search(address) |
| NAME | search(name) |
| TELEPHONE NUMBER | ¥(¥d+)¥ - (¥d+)¥ - |
| REFERENCE NUMBER | (¥d|¥w) + |
| BILLER | (!Dear & !Attention) & (company limited|(Co. Ltd)| search(name)) |

| KEY |
|---|
| CHARGED AMOUNT |
| POSTAL ADDRESS |
| TELEPHONE NUMBER |

*FIG. 10B*

| KEY | VALUE |
|---|---|
| CHARGED AMOUNT | 5000 YEN |
| POSTAL ADDRESS | XXXX CHIYODA-KU, TOKYO |
| TELEPHONE NUMBER | 03-XXXX-XXXXX |

FIG. 12

| SEARCH RULE | VALUE TYPE RULE | | | |
|---|---|---|---|---|
| | 1 | 2 | 3 | 4 |
| AMOUNT | ~? | ¥¥ ? | ((¥d+), ?) | +yen? |
| POSTAL ADDRESS | search(address) | | | |
| NAME | search(name) | | | |
| TELEPHONE NUMBER | ¥(¥d+)¥ ~ (¥d+)¥ ~ | | | |
| REFERENCE NUMBER | (¥d|¥w) + | | | |
| BILLER | (!Dear & !Attention)& (company limited|(Co. Ltd)| search(name)) | | | |

| METADATA TEMPLATE | ACCOUNTING WORK | | LEGAL WORK | |
|---|---|---|---|---|
| | KEY | EXAMPLE OF VALUE | KEY | EXAMPLE OF VALUE |
| METADATA | CHARGED AMOUNT | 47875000 | REFERENCE NUMBER | 123456 |
| | DELIVERY DATE | 2015/10/25 | CLIENT | TARO KAWASAKI |
| | REFERENCE NUMBER | ABC-123 | DATE | 2017/12/22 |

| DOCUMENT TYPE SELECTION OPTION | WRITTEN ESTIMATE | STATEMENT OF DELIVERY | ORDER |
|---|---|---|---|

IMAGE PROCESSING APPARATUS THAT SETS METADATA OF IMAGE DATA, METHOD OF CONTROLLING SAME, AND STORAGE MEDIUM

BACKGROUND OF THE INVENTION

Field of the Invention

The present invention relates to an image processing apparatus that sets metadata of image data, a method of controlling the same, and a storage medium.

Description of the Related Art

There has been known an image processing apparatus configured to generate image data by scanning a document and extract character strings of the document as digital data by performing an OCR (Optical Character Recognition) process on the generated image data. The image processing apparatus divides the generated image data into a plurality of areas including character string areas and background areas to thereby recognize the structure of the image data, and generates e.g. metadata (additional data) including character strings included in the character string areas as information for use by a destination system to which the image data is to be output. The image processing apparatus transmits the generated metadata and the image data to the destination system. The contents of the metadata are different depending on the type of the destination system. For example, in a case where the destination system is an accounting system that handles accounting forms, such as estimation sheets and receipts, the image processing apparatus generates metadata including information on a delivery date and an amount of money included in an accounting form. In this example, items, such as a delivery date and an amount of money, are referred to as keys, and specific values of the respective items, such as a character string indicating the date of the delivery date and a character string indicating the amount of money, are referred to as values. When setting contents of metadata, for example, the image processing apparatus extracts digital data of character string areas from image data of a receipt, and highlights, on a preview image, a plurality of character string areas corresponding to candidates of the value of "price" which is a key, so as to prompt a user to select information to be added as the metadata (see e.g. Japanese Laid-Open Patent Publication (Kokai) No. 2017-194953). This enables the user to easily set the contents of the metadata which is to be transmitted to the destination system together with the image data.

However, since the contents of metadata are different depending on the type of a destination system, the above-mentioned technique disclosed in Japanese Laid-Open Patent Publication (Kokai) No. 2017-194953 requires a user to change settings for identifying character string areas corresponding to candidates of the value of a key from image data, for each destination system type. That is, the conventional image processing apparatus cannot enable the user to easily set the contents of metadata of image data.

SUMMARY OF THE INVENTION

The present invention provides an image processing apparatus that enables easy setting of metadata of image data, a method of controlling the same, and a storage medium.

In a first aspect of the present invention, there is provided an image processing apparatus that performs: identifying a key candidate from image data based on one or more key types defined according to a selected work, identifying a value candidate corresponding to the identified key candidate based on a value type rule and a value search area rule which are defined for each of the one or more key types, and setting the identified value candidate as metadata of the image data.

In a second aspect of the present invention, there is provided a method comprising identifying a key candidate from image data based on one or more key types defined according to a selected work, identifying a value candidate corresponding to the identified key candidate based on a value type rule and a value search area rule which are defined for each of the one or more key types, and setting the identified value candidate as metadata of the image data.

In a third aspect of the present invention, there is provided a non-transitory computer-readable storage medium storing a computer-executable program for causing a computer to perform: identifying a key candidate from image data based on one or more key types defined according to a selected work, identifying a value candidate corresponding to the identified key candidate based on a value type rule and a value search area rule which are defined for each of the one or more key types, and setting the identified value candidate as metadata of the image data.

According to the present invention, it is possible to easily set metadata of image data.

Further features of the present invention will become apparent from the following description of exemplary embodiments (with reference to the attached drawings).

BRIEF DESCRIPTION OF THE DRAWINGS

FIGS. 8A to 8C are diagrams showing examples of dictionaries used in the metadata setting process in FIG. 7.

FIGS. 10A and 10B are diagrams useful in explaining keys defined for a work.

FIG. 12 is a diagram showing an example of a value type search dictionary used in the metadata setting process in FIG. 11.

FIG. 14 is a diagram showing an example of a metadata template that is used for generating metadata, and stored in an HDD of the storage server shown in FIG. 4B.

DESCRIPTION OF THE EMBODIMENTS

The present invention will now be described in detail below with reference to the accompanying drawings showing embodiments thereof.

Figure 1:
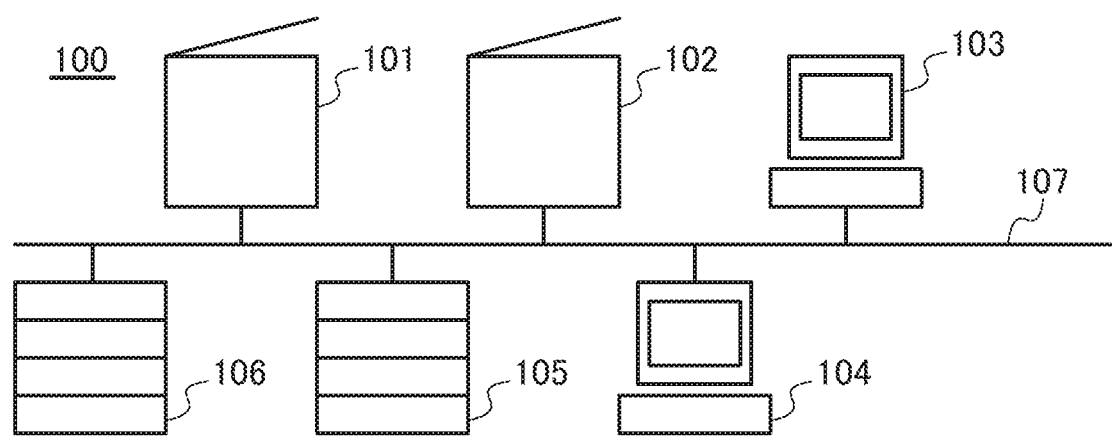
FIG. 1 is a schematic network diagram of a network configuration of an image forming system including an image processing server as an image processing apparatus according to an embodiment of the present invention.

FIG. 1 is a schematic network diagram of a network configuration of an image forming system 100 including an image processing server 105 as an image processing apparatus according to an embodiment of the present invention. Referring to FIG. 1, the image forming system 100 includes an image forming apparatus 101, an image forming apparatus 102, an information processing apparatus 103, an information processing apparatus 104, the image processing server 105, and a storage server 106. The image forming apparatus 101, the image forming apparatus 102, the information processing apparatus 103, the information processing apparatus 104, the image processing server 105, and the storage server 106 are interconnected by a network 107. Note that in the present embodiment, the respective numbers of the image forming apparatuses, the information processing apparatuses, the image processing server, and the storage server, included in the image forming system 100, are set by way of example, but this is not limitative. The image forming system 100 is only required to include at least one image forming apparatus, at least one information processing apparatus, at least one image processing server, and at least one storage server. Further, in the present embodiment, the image forming apparatus 101 and the image forming apparatus 102 have the same configuration, and hence in the following description, the configuration of the image forming apparatus 101 will be described a representative example.

The image forming apparatus 101 is an MFP (Multifunction Peripheral) equipped with a plurality of functions, such as a copy function, a scan function, and a print function. The image forming apparatus 101 performs printing based on print data received from the information processing apparatus 103 or the information processing apparatus 104. Also, the image forming apparatus 101 obtains document data from the storage server 106 and prints the obtained document data. Further, the image forming apparatus 101 reads a document using a scanner 209, described hereinafter with reference to FIG. 2, to generate image data. The image data is printed by a printer 207, described hereinafter with reference to FIG. 2, or transmitted to the information processing apparatus 103, the information processing apparatus 104, the image processing server 105, etc. The image processing server 105 performs image processing, such as an OCR (Optical Character Recognition) process and an image diving process, described hereinafter with reference to FIG. 6, on the image data obtained from the image forming apparatus 101. The image processing server 105 transmits the processed image data to the storage server 106. The storage server 106 stores a plurality of data items, such as document data items and processed image data items obtained from the image processing server 105. Note that the image processing server 105 and the storage server 106 may be servers that provide cloud services via the Internet. The network 107 is e.g. a LAN (Local Area Network) or the Internet.

Figure 2:
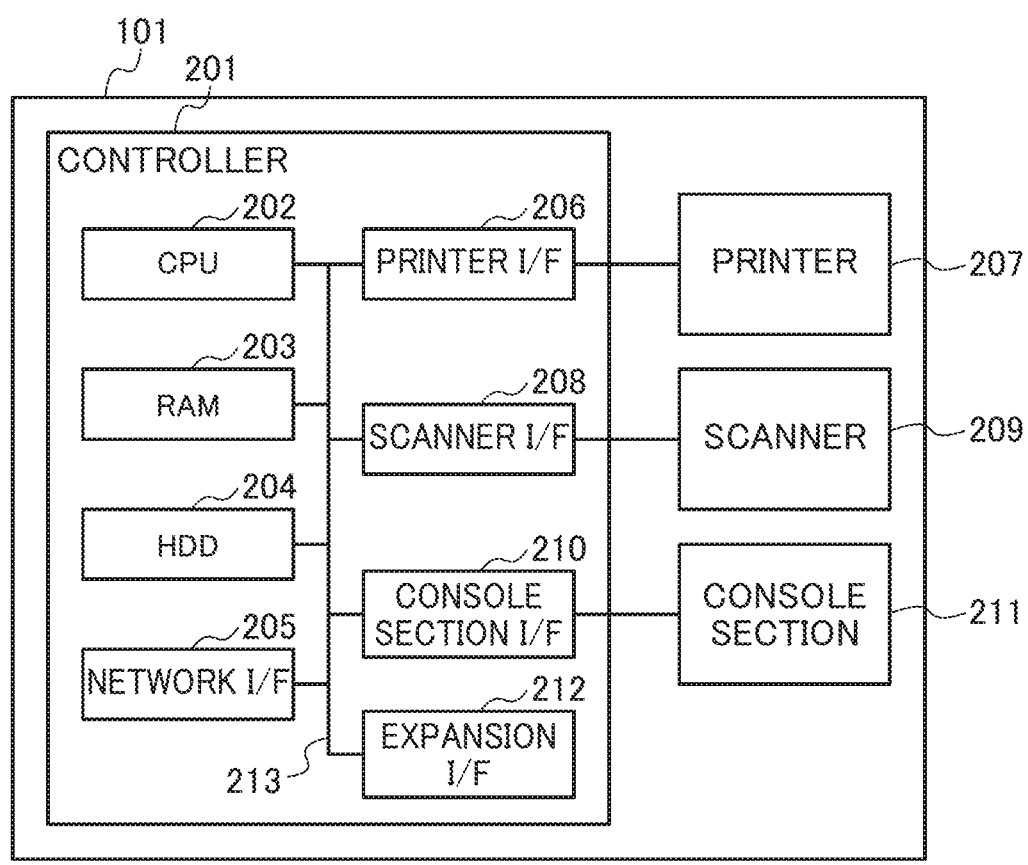
FIG. 2 is a schematic block diagram of the configuration of an image forming apparatus appearing in FIG. 1.

FIG. 2 is a schematic block diagram of the configuration of the image forming apparatus 101 appearing in FIG. 1. Referring to FIG. 2, the image forming apparatus 101 includes a controller 201, the printer 207, the scanner 209, and a console section 211. The controller 201 is connected to the printer 207, the scanner 209, and the console section 211. Further, the controller 201 includes a CPU 202, a RAM 203, an HDD 204, a network interface 205, a printer interface 206, a scanner interface 208, a console section interface 210, and an expansion interface 212. The CPU 202, the RAM 203, the HDD 204, the network interface 205, the printer interface 206, the scanner interface 208, the console section interface 210, and the expansion interface 212 are interconnected by a bus 213.

The CPU 202 loads a command read from the HDD 204 into the RAM 203 and executes the command loaded in the RAM 203. The RAM 203 temporarily stores the command read from the HDD 204 by the CPU 202. The RAM 203 also stores data necessary for execution of commands. For example, for image processing, input data is loaded into the RAM 203. The HDD 204 stores commands executed by the CPU 202, settings used by the image forming apparatus 101, data associated with processing instructed by a user, and so forth. The network interface 205 is an interface for performing network communication between the image forming apparatus 101 and an external apparatus. For example, the network interface 205 notifies the CPU 202 that data has been received from the information processing apparatus 103, the information processing apparatus 104, or the like. Further, the network interface 205 transmits data stored in the RAM 203 to the information processing apparatus 103, the information processing apparatus 104, the image processing server 105, or the like.

The printer interface 206 controls exchange of data between the controller 201 and the printer 207. For example, the printer interface 206 sends print data received from the CPU 202 to the printer 207, and further sends information indicating the status of the printer 207, received from the printer 207, to the CPU 202. The printer 207 prints image data received from the printer interface 206 on a sheet. The scanner interface 208 controls exchange of data between the controller 201 and the scanner 209. For example, the scanner interface 208 sends an image reading instruction received from the CPU 202 to the scanner 209, and further sends image data received from the scanner 209 to the CPU 202. The scanner 209 reads a document placed thereon to generate image data according to an image reading instruction received from the scanner interface 208. The console section interface 210 controls exchange of data between the controller 201 and the console section 211. For example, the console section interface 210 sends an instruction input by a user from the console section 211 to the CPU 202, and further receives information on a screen on which a user performs operation from the CPU 202, and sends the received information on the screen to the console section 211.

Figure 3:
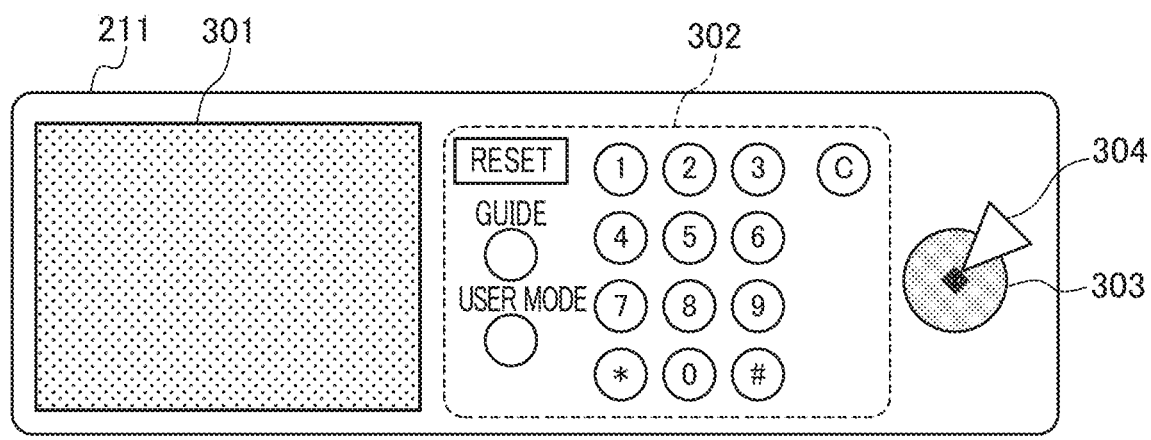
FIG. 3 is a view of a console section appearing in FIG. 2.

FIG. 3 is a view of the console section 211 appearing in FIG. 2. The console section 211 includes, as shown in FIG. 3, a touch panel screen 301, setting keys 302, a start key 303, and a cancel key 304. A user configures the settings of a job by operating the touch panel screen 301 and the setting keys 302. The job is, for example, a copy job or a job of reading a document to generate image data and transmitting the generated image data to the image processing server 105. The start key 303 is an operation button for starting execution of the above-mentioned job. The cancel key 304 is an operation button for canceling the job being executed. The expansion interface 212 is an interface for connecting an external device to the image forming apparatus 101. For example, the expansion interface 212 includes a USB (Universal Serial Bus) format interface. The expansion interface 212 performs control for reading data stored in an external storage device connected to the image forming apparatus 101, such as a USB memory, and control for writing data into the external storage device.

Figure 4A:
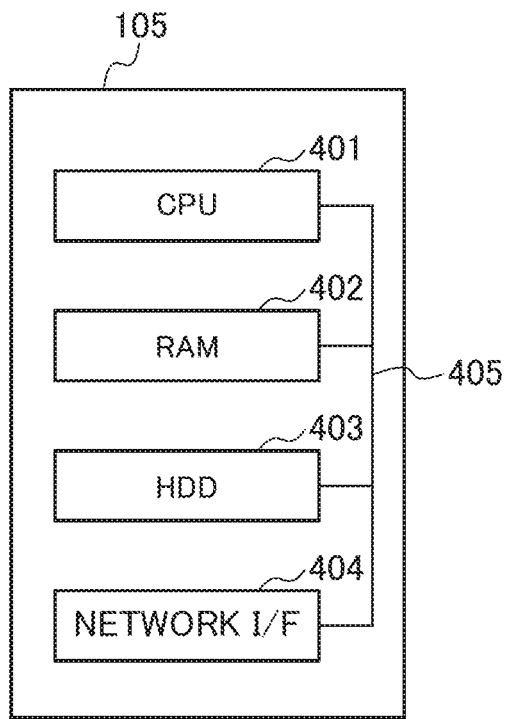
FIGS. 4A and 4B are schematic block diagrams of the configurations of the image processing server and a storage server appearing in FIG. 1, respectively.
Figure 4B:
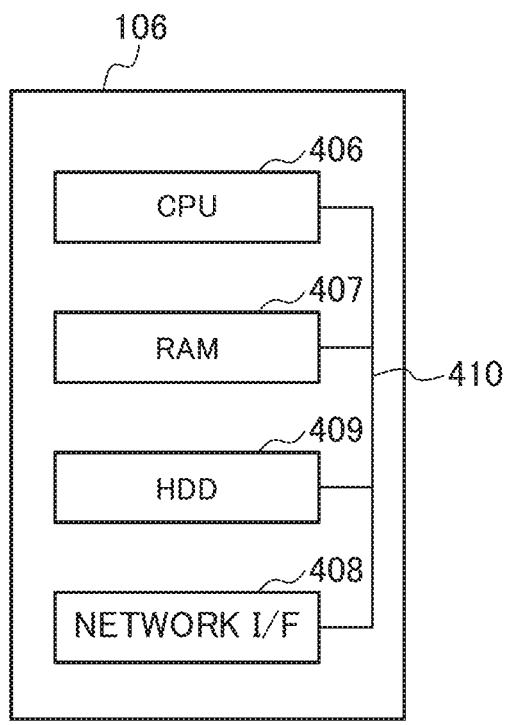

FIGS. 4A and 4B are schematic block diagrams of the configurations of the image processing server 105 and the storage server 106 appearing in FIG. 1, respectively. FIG. 4A shows the configuration of the image processing server 105. FIG. 4B shows the configuration of the storage server 106.

Referring to FIG. 4A, the image processing server 105 includes a CPU 401, a RAM 402, an HDD 403, and a network interface 404. The CPU 401, the RAM 402, the HDD 403, and the network interface 404 are interconnected by a bus 405.

The CPU 401 performs centralized control of the whole image processing server 105. The CPU 401 loads a program read from the HDD 403 into the RAM 402 and executes the program loaded in the RAM 402. The network interface 404 is used for network communication between the image processing server 105 and an external apparatus. For example, the network interface 404 receives image data from the image forming apparatus 101.

Referring to FIG. 4B, the storage server 106 includes a CPU 406, a RAM 407, a network interface 408, and an HDD 409. The CPU 406, the RAM 407, the network interface 408, and the HDD 409 are interconnected by a bus 410.

The CPU 406 performs centralized control of the whole storage server 106. The CPU 406 loads a program read from the HDD 409 into the RAM 407 and executes the program loaded in the RAM 407. The network interface 408 is used for network communication between the storage server 106 and an external apparatus. The HDD 409 stores image data obtained from the image processing server 105, metadata associated with the obtained image data, and so forth. The metadata includes information on specific character strings extracted from the received image data. Further, the HDD 409 stores a metadata template for use in generating such metadata as shown in FIG. 14.

The HDD 409 stores the metadata templates different for each type of work, such as an accounting work and a legal work. The metadata template is formed by one or more keys and a value corresponding to each key. In the illustrated example in FIG. 14, the metadata template for the accounting work is formed by the three keys of "charged amount", "delivery date", and "reference number", and values corresponding to these keys. Further, in the illustrated example in FIG. 14, the metadata template for the legal work is formed by the three keys of "reference number", "client", and "date", and values corresponding to these keys. Note that in the present embodiment, it is also possible to set not a fixed value but a selectable value, as a value corresponding to a key. When setting a selectable value as a value corresponding to a key, a user or administrator is required to set a plurality of values as choices for each key in advance.

In the image forming system 100, for example, in a case where image data generated by the image forming apparatus 101 or the like is stored in the storage server 106, the image processing server 105 obtains a metadata template associated with a selected work from the storage server 106. The image processing server 105 generates metadata based on the image data and the metadata template, and transmits the image data and the metadata to the storage server 106. The storage server 106 stores the image data and the metadata in association with each other. In the image forming system 100, the image data with which the metadata is thus associated is used when a user searches for image data, for example. The storage server 106 searches a plurality of image data items stored therein, for image data with which metadata including a character string designated by the user is associated. For example, by designating "charged amount", it is possible to easily retrieve image data with which metadata including "charged amount" is associated.

Further, it is possible to improve efficiency of the work by outputting metadata and image data stored in the storage server 106 to another system. For example, metadata including accounting information, such as "charged amount" and "delivery date", is output to an accounting system requiring posting of accounting information described in a document. This makes it possible to easily post the accounting information using the metadata without performing manual work and thereby improve the efficiency of the posting work.

Figure 5:
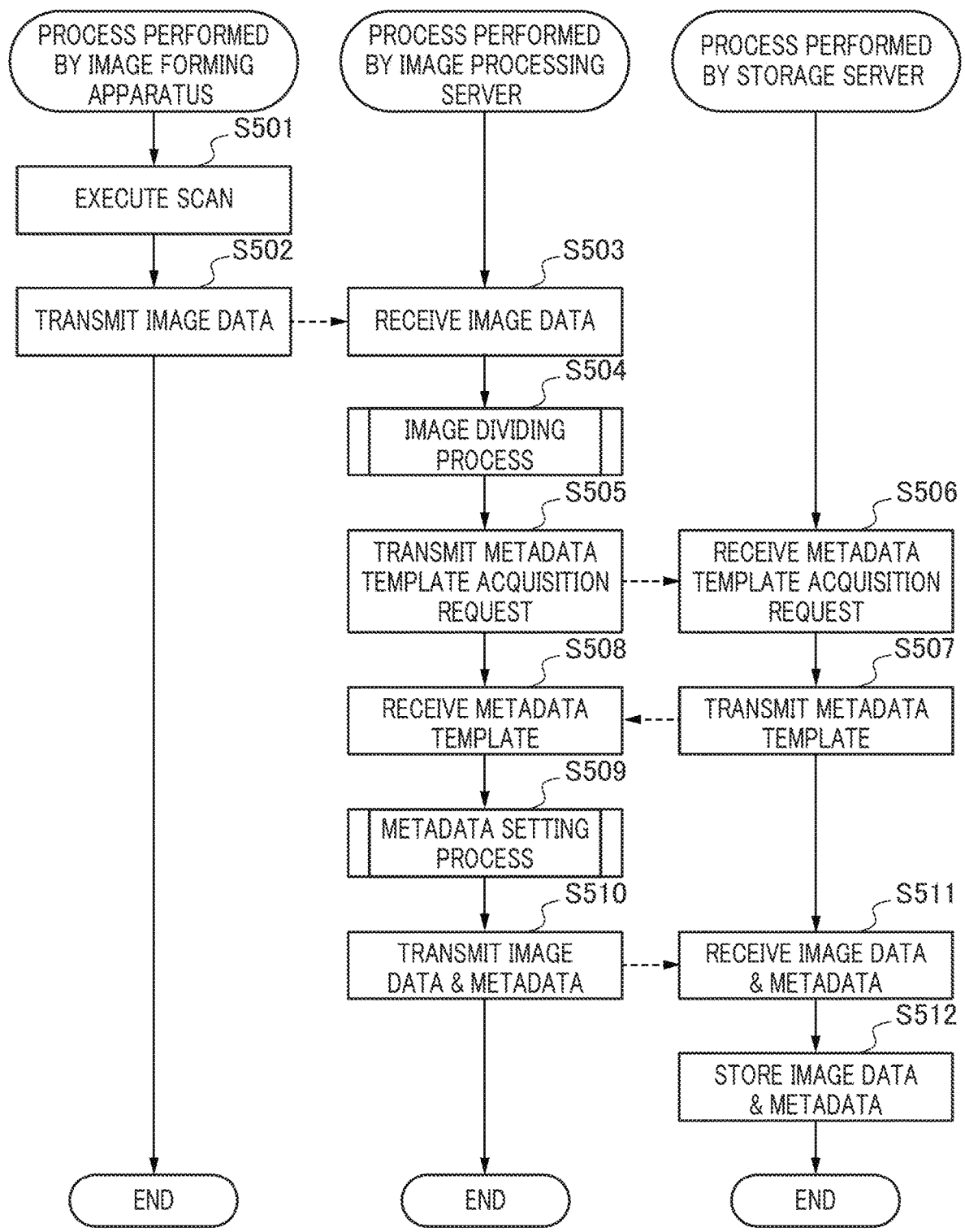
FIG. 5 is a flowchart of a data storing process performed by the image forming system shown in FIG. 1.

FIG. 5 is a flowchart of a data storing process performed by the image forming system 100 shown in FIG. 1. Steps S501 and S502 of the process in FIG. 5, described hereinafter, are executed e.g. by the image forming apparatus 101. A program associated with these steps is loaded into the RAM 203 from the HDD 204 where it is stored, and is executed by the CPU 202. Further, steps S503 to S505, and S508 to S510 of the process in FIG. 5, described hereinafter, are executed by the image processing server 105. A program associated with these steps is loaded from the HDD 403 where it is stored into the RAM 402, and is executed by the CPU 401. Further, steps S506, S507, S511, and S512 of the process in FIG. 5, described hereinafter, are executed by the storage server 106. A program associated with these steps is loaded from the HDD 409 where it is stored into the RAM 407, and is executed by the CPU 406.

Referring to FIG. 5, first, upon receipt of an instruction for scanning a document given e.g. by pressing of the start key 303, the CPU 202 of the image forming apparatus 101 performs a scan process (step S501). In the step S501, the CPU 202 instructs the scanner 209 to execute scanning, so that the scanner 209 scans the document and generates image data. Then, the CPU 202 transmits the generated image data to the image processing server 105 via the network interface 205 (step S502). For example, in a case where an instruction for scanning a plurality of pages of a document is received, the image forming apparatus 101 generates a plurality of image data items corresponding to the respective pages and transmits the generated image data items of all pages to the image processing server 105.

Upon receipt of the image data from the image forming apparatus 101 (step S503), the CPU 401 of the image processing server 105 performs an image dividing process, described in detail hereinafter with reference to FIG. 6, on the received image data (step S504). In the step S504, data necessary for generating metadata of the image data is generated.

Figure 6:
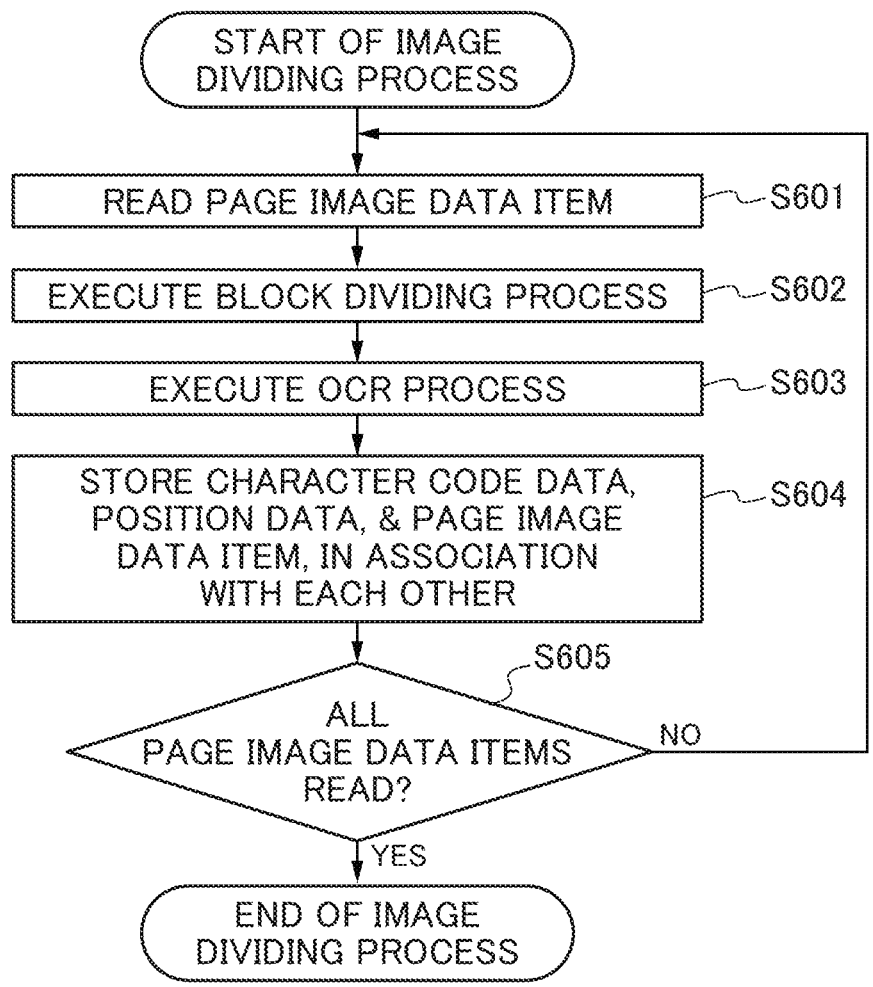
FIG. 6 is a flowchart of an image dividing process in a step in FIG. 5.

FIG. 6 is a flowchart of the image dividing process in the step S504 in FIG. 5. Referring to FIG. 6, the CPU 401 reads image data of one page (hereinafter referred to as the "page image data item") from the image data received in the step S503 (step S601). Then, the CPU 401 performs a block dividing process on the read page image data item (step S602). In the block dividing process, the CPU 401 analyzes the structure of the page image data item and divides the page image data item into a background area and character string areas. As a result of the block dividing process in the step S602, the page image data item is stored in the HDD 403 in association with position data and attribute data of each of areas into which the page image data item is divided (hereinafter referred to as the "divided areas"). The position data indicates a position of a divided area in the page image data item. The attribute data indicates whether the divided area is a background area or a character string area. In the present embodiment, each divided area is expressed e.g. by a rectangle. The position data of the divided area is expressed by a combination of information items which indicate coordinates of an upper left vertex of the divided area, a width of the rectangle, and a height of the rectangle, respectively. Note that the shape of the divided area may be a desired shape other than the rectangle.

Then, the CPU 401 reads data associated with each character string area form the result of the block dividing process in the step S602. The CPU 401 performs the OCR process on the character string area (step S603) to acquire character code data indicating a character string included in the character string area. Then, the CPU 401 stores character code data thus acquired, the position data of each character string area, and the page image data item, in the HDD 403 in association with each other (step S604). Then, the CPU 401 determines whether or not all of the page image data items received in the step S503 have been read (step S605).

If it is determined in the step S605 that any of the page image data items received in the step S503 has not been read, the CPU 401 returns to the step S601. If it is determined in the step S605 that all of the page image data items received in the step S503 have been read, the CPU 401 terminates the image dividing process and executes the step S505 in FIG. 5. The image processing server 105 thus performs the image dividing process, thereby obtaining the position data items of the character string areas in all of the page image data items generated by the image forming apparatus 101 in the step S501 and the character code data items of the character string areas.

Referring again to FIG. 5, the CPU 401 of the image processing server 105 transmits a request for acquiring a metadata template associated with the selected work to the storage server 106 (step S505). The CPU 406 of the storage server 106 receives the acquisition request from the image processing server 105 (step S506) and reads the metadata template associated with the received acquisition request from the HDD 409. Then, the CPU 406 transmits the read metadata template to the image processing server 105 (step S507). For example, the CPU 406 transmits the metadata template for accounting work, including "charged amount", "delivery date", and "reference number" as the keys, as shown in FIG. 14, to the image processing server 105.

The CPU 401 of the image processing server 105 receives the metadata template from the storage server 106 (step S508) and stores the received metadata template in the HDD 403. Then, the CPU 401 performs a metadata setting process, described hereinafter with reference to FIG. 7, based on the metadata template stored in the HDD 403 (step S509) to generate metadata of the image data received in the step S503. Then, the CPU 401 transmits the image data and the metadata to the storage server 106 via the network interface 404 (step S510).

The CPU 406 of the storage server 106 receives the image data and the metadata from the image processing server 105 via the network interface 408 (step S511). The CPU 406 stores the received image data and metadata in the HDD 409 in association with each other (step S512), followed by terminating the present process.

Figure 7:
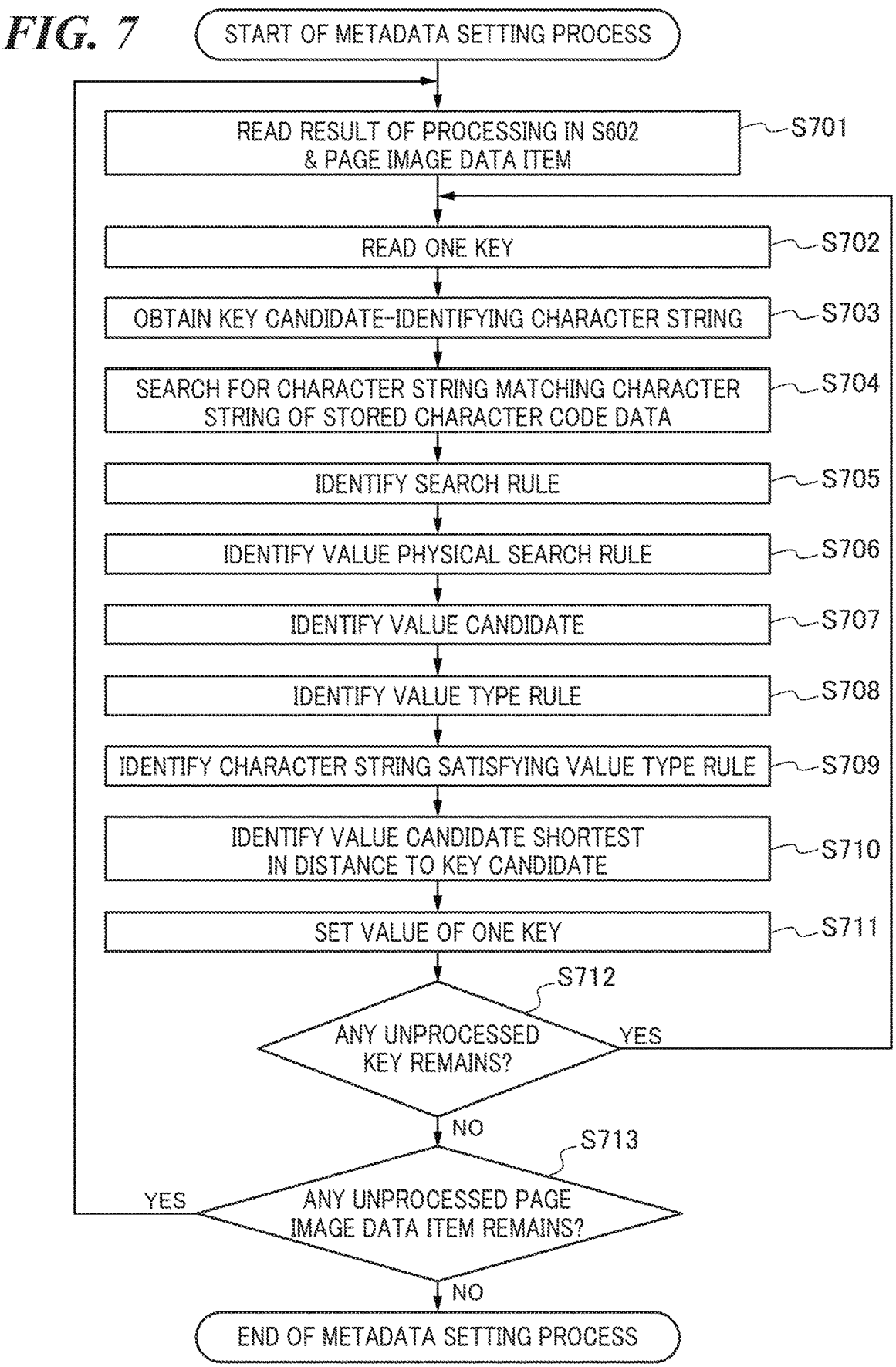
FIG. 7 is a flowchart of a metadata setting process in a step in FIG. 5.

FIG. 7 is a flowchart of the metadata setting process in the step S509 in FIG. 5. Referring to FIG. 7, the CPU 401 of the image processing server 105 reads a page image data item and a result of the block dividing process in the step S602 associated therewith (step S701). Then, the CPU 401 reads one key of the keys in the metadata template stored in the HDD 403 (step S702). In the step S702, for example, the CPU 401 reads "charged amount" as the one key from the metadata template for the accounting work, including "charged amount", "delivery date", and "reference number" as the keys. Then, the CPU 401 obtains at least one character string for identifying a character string in the page image data item as a key candidate of the one key (hereinafter referred to as "key candidate-identifying character string(s)") from an associated-key conversion dictionary 801 (step S703). In the associated-key conversion dictionary 801, information on the keys of all metadata templates managed by the storage server 106 is registered. In the associated-key conversion dictionary 801, one or more key candidate-identifying character strings (key characters on a page) are registered in association with one key (associated key). That is, in the present embodiment, for example, even when a character string included in a character string area is other than "charged amount", more specifically, a character string "total amount" or "sum" which is registered in association with "charged amount" in the associated-key conversion dictionary 801, the character string included in the character string area is recognized as "charged amount". Further, one search rule is registered for one key candidate-identifying character string (key characters on a page), thereby definitely defining the search rule of each key candidate-identifying character string. In the step S703, the CPU 401 obtains, for example, "total amount", "sum", and "charged amount" which are associated with "charged amount" read from the associated-key conversion dictionary 801 as the one key in the step S702, as the key candidate-identifying character strings.

Then, the CPU 401 reads character code data and position data stored in association with the page image data item in the HDD 403 in the step S604. Then, the CPU 401 searches the key candidate-identifying character strings obtained in the step S703, such as "total sum", "sum", and "charged amount", for a character string which matches the character string indicated by the character code data stored in the HDD 403 (step S704). In other words, by executing the steps S702 to S704, the CPU 401 determines whether or not there is a character string area including a character string corresponding to the one key, in the page image data item. Then, the CPU 401 identifies a search rule associated with the found key candidate-identifying character string from the associated-key conversion dictionary 801 (step S705). Then, the CPU 401 identifies a value physical search rule associated with the identified search rule from a value physical search dictionary 802 shown in FIG. 8B (step S706).

Figure 9A:
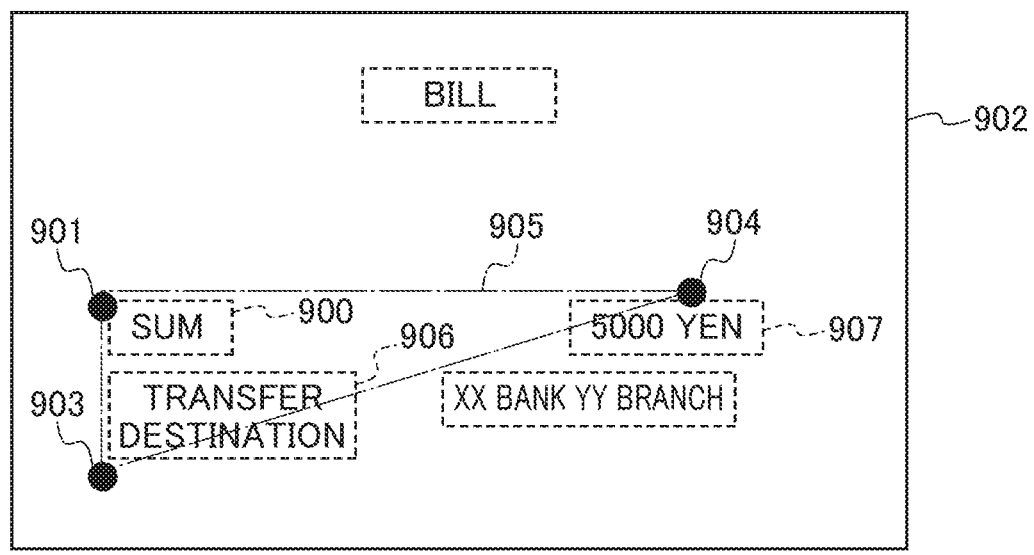
FIGS. 9A and 9B are diagrams useful in explaining a search area of a value physical search rule in FIG. 8B.
Figure 9B:
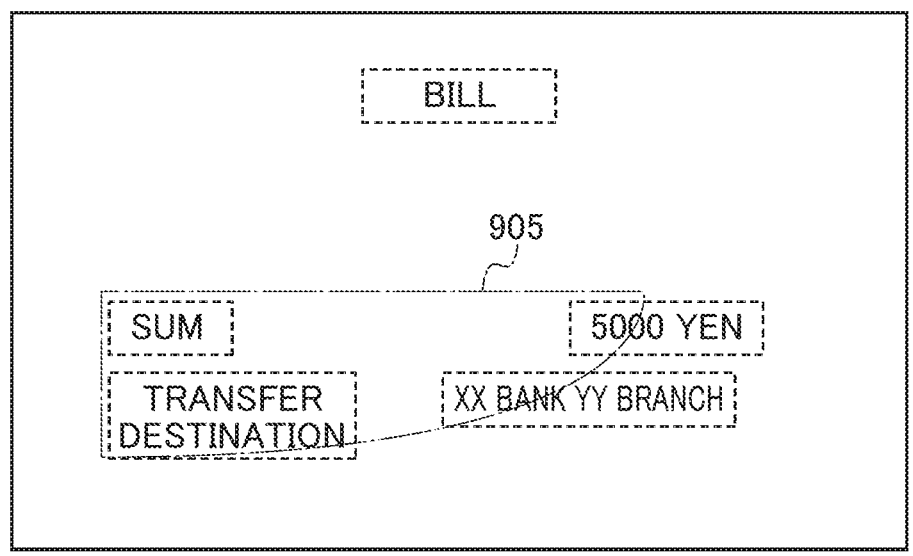

The value physical search rule defines a distance from a character string area including a character string which matches a key candidate-identifying character string, such as a distance from an upper left vertex 901 of a character string area 900 appearing in FIG. 9A. That is, a value after L of each value physical search rule, as appearing in FIG. 8B, represents a distance from the upper left vertex of a character string area including a character string which matches a key candidate-identifying character string, in a direction toward the left. A value after R of the value physical search rule represents a distance from the upper left vertex of the character string area in a direction toward the right. A value after T of the value physical search rule represents a distance from the upper left vertex of the character string area in a direction toward the top. A value after B of the value physical search rule represents a distance from the upper left vertex of the character string area in a direction toward the bottom. For example, in the value physical search dictionary 802, the value physical search rule of "amount" is defined as L: 0 cm, R: 10 cm, T: 0 cm, and B: 2 cm. The value physical search rule of "amount" indicates that character strings included in an area 905, in a page image data item 902, which is formed by the vertex 901, a vertex 903 at a location 2 cm downward from the upper left vertex 901, and a vertex 904 at a location 10 cm rightward from the upper left vertex 901 are value candidates. Note that the shape of the area 905 may be a right triangle shape as shown in FIG. 9A, or may be a circular sector-like shape as shown in FIG. 9B.

Then, the CPU 401 identifies value candidates based on the identified value physical search rule (step S707) (operation of a value candidate-identifying unit). For example, in FIG. 9A, at least parts of a character string area 906 and a character string area 907 are included in the area 905. At this time, in the step S707, the CPU 401 identifies "transfer destination" included in the character string area 906 and "5000 yen" included in the character string area 907 as value candidates of the character strings of the key candidates included in the character string area 900. The CPU 401 stores the position data indicating the position of each character string area including the identified value candidate, and character code data indicating the identified value candidate in the RAM 402. Then, the CPU 401 identifies a value type rule corresponding to the search rule identified in the step S705 from a value type search dictionary 803 shown in FIG. 8C (step S708), and stores the identified value type rule in the RAM 402. The value type rule is a rule for extracting a character string of a specific type from image data, and is expressed e.g. by regular expression, such as "−?¥¥?((¥n+), ?)+yen?". Note that the value type rule is only required to be a rule for identifying a value from character information, and for example, it may be a rule for executing processing using complete matching of one or more characters.

Then, the CPU 401 narrows the value candidates identified in the step S707. More specifically, the CPU 401 identifies a character string satisfying the above-mentioned value type rule from the value candidates identified in the step S707 (step S709) (operation of a value candidate-identifying unit). In the step S709, for example, the CPU 401 determines whether or not "transfer destination" and "5000 yen" as the value candidates satisfy the regular expression "−?¥¥?((¥n+), ?)+yen?" which is the value type rule. This determination is performed by the following command expressed in a programming language capable of using regular expression, such as the Perl language:

$value_candidate=~/−?¥¥?((¥n+), ?)+yen?/g

As a result of the determination, the value candidate "5000 yen" satisfies the above-mentioned regular expression, and hence the CPU 401 holds the stored position data of the character string area 907 and the character code data indicating "5000 yen" in the RAM 402. Further, "transfer destination" does not satisfy the regular expression, and hence the CPU 401 deletes the stored position data of the character string area 906 and the character code data indicating "transfer destination" from the RAM 402.

Then, the CPU 401 further narrows the value candidates identified in the step S707. More specifically, the CPU 401 identifies a value candidate that is shortest in distance to the character string area 900 from the value candidates identified in the step S709 (step S710) (operation of a value candidate-identifying unit). In the step S710, the CPU 401 calculates a distance between the character string area 900 and the value candidate in the page image data item using the position data of the character string area 900 and the position data of the value candidate. The CPU 401 calculates the above-mentioned distance using e.g. Euclidean distance or Manhattan distance. That is, in the present embodiment, a value candidate corresponding to the key candidate is identified based on the value type rule and the distance to the character string corresponding to the key candidate. Then, the CPU 401 sets the character string of the value candidate identified in the step S710 as the value of the one key (step S711). For example, as the metadata of the work to which "charged amount", "postal address", and "telephone number" are defined as the keys as shown in FIG. 10A, metadata in which "5000 yen" is set as the value of "charged amount" is generated (see e.g. FIG. 10B). Then, the CPU 401 determines whether or not there remains any unprocessed key in the keys of the metadata template (step S712).

If it is determined in the step S712 that there remains any unprocessed key in the keys of the metadata template, the CPU 401 returns to the step S702 and reads an unprocessed key, for example, "delivery date", from "charged amount", "delivery date", and "reference number". Thus, in the present embodiment, the above-described process is executed with respect to all keys of the metadata template received in the step S508. If it is determined in the step S712 that there remains no unprocessed key in the keys of the metadata template, the CPU 401 determines whether or not there remains any unprocessed page image data item in the obtained image data (step S713).

If it is determined in the step S713 that there remains any unprocessed page image data item in the obtained image data, the CPU 401 returns to the step S701. If it is determined in the step S713 that there remains no unprocessed page image data item in the obtained image data, the CPU 401 stores the metadata having the values set by the above-described process in the RAM 402. Then, the CPU 401 terminates the metadata setting process and executes the step S510 described with reference to FIG. 5.

According to the above-described embodiment, a key candidate is identified from a page image data item based on one or more keys (key types) defined according to a selected work. A value candidate corresponding to the key candidate is identified based on the value type rule defined for each key and the value physical search rule (value search area rule). The identified value candidate is set as a value included in the metadata. This makes it possible to eliminate the need of changing the setting for identifying a value according to a type of the destination system, when generating metadata of image data, which enables easy setting of the contents of the metadata of the image data.

Further, in the above-described embodiment, the value type rule is a rule for extracting a character string of a specific type from image data. Further, the value type rule is expressed by regular expression. With this, it is possible to positively extract a character string of a specific type satisfying the value type rule from image data, as a character string to be included in the metadata of the image data.

In the above-described embodiment, a value candidate corresponding to a key candidate is identified based on the value type rule and the distance to a character string corresponding to the key candidate. With this, it is possible to set a character string which is suitable as a value corresponding to the key candidate, more specifically, a character string which is at a location relatively close to the key candidate and satisfies the value type rule, in the metadata.

Although the present invention has been described heretofore based on the embodiment thereof, the present invention is not limited to the above-described embodiment. For example, not the image processing server 105, but the image forming apparatus 101 (or the image forming apparatus 102) may continue to execute the steps 504 to S510 after executing the steps S501 and S502. Even when the image forming apparatus 101 (or the image forming apparatus 102) continue to execute the steps 504 to S510 after executing the steps S501 and S502, it is possible to obtain the same advantageous effects as provided by the above-described embodiment.

Further, in the above-described embodiment, a value candidate corresponding to a key candidate may be identified based on a matching rate, described hereinafter.

Figure 11:
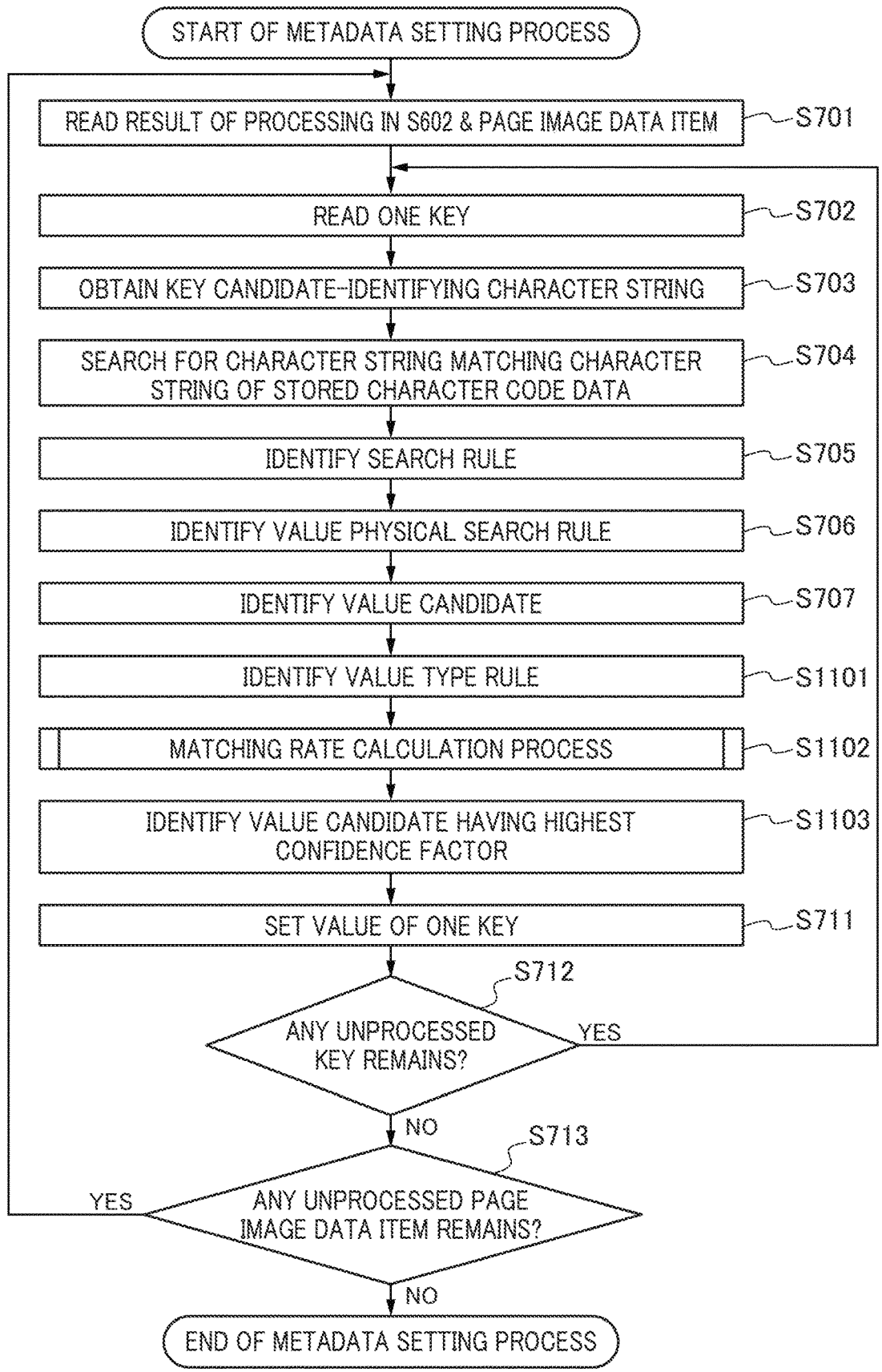
FIG. 11 is a flowchart of a variation of the metadata setting process in FIG. 7.

FIG. 11 is a flowchart of a variation of the metadata setting process in FIG. 7. Referring to FIG. 11, the CPU 401 executes the steps S701 to S707. Then, the CPU 401 identifies a value type rule corresponding to the search rule identified in the step S705 from a value type search dictionary 1201 shown in FIG. 12 (step S1101), and stores the identified value type rule in the RAM 402. For example, in a case where a search rule identified in the step S705 is "amount", the four rules of "−?", "¥¥?", "((¥d+), ?)", and "+yen?", expressed by regular expression, are stored in the RAM 402, as the value type rules corresponding to the search rule. Then, the CPU 401 performs a matching rate calculation process in FIG. 13 (step S1102) to thereby calculate a matching rate between each value candidate and the value type rules stored in the RAM 402.

Figure 13:
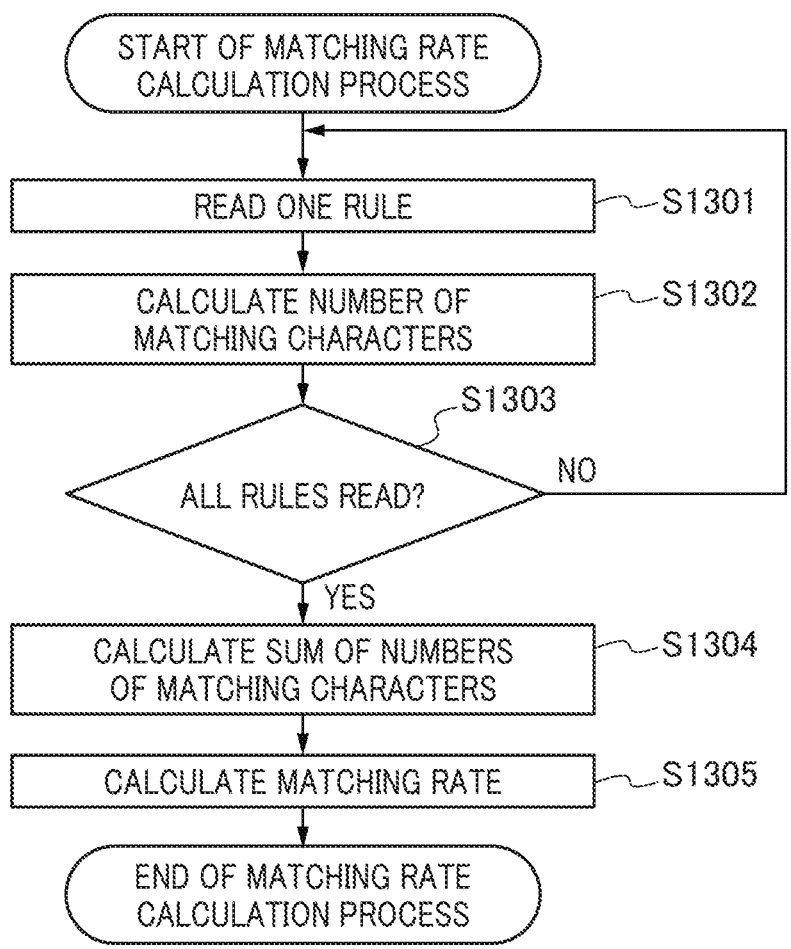
FIG. 13 is a flowchart of a matching rate calculation process in a step in FIG. 11.

FIG. 13 is a flowchart of the matching rate calculation process in the step S1102 in FIG. 11. Referring to FIG. 13, the CPU 401 reads one rule of the value type rules stored in the RAM 402 (step S1301). For example, in a case where the four rules of "−?", "¥¥?", "((¥d+), ?)", and "+yen?" are stored in the RAM 402 as the value type rules corresponding to the search rule of "amount", in the step S1301, the CPU 401 reads "−?" of these four rules. Then, the CPU 401 applies the read rule to the value candidate and calculates the number of matching characters (step S1302). Calculation of the number of matching characters is performed by the following command expressed in a programming language which can use regular expression, such as the Perl language. Note that value_candidate represents a value candidate:

my$count=0;

$count$^{++}$ while $value_candidate=~/−?/g;

Then, the CPU 401 determines whether or not all of the rules stored in the RAM 402 have been read (step S1303).

If it is determined in the step S1303 that any of the rules stored in the RAM 402 has not been read, the CPU 401 returns to the step S1301. In the step S1301, the CPU 401 reads a rule which has not been read, for example, "¥¥?" of "−?", "¥¥?", "((¥d+), ?)", and "+yen?".

If it is determined in the step S1303 that all of the rules stored in the RAM 402 have been read, the CPU 401 calculates the sum of the numbers of matching characters by the rules (step S1304). The CPU 401 stores the calculated sum of the numbers of matching characters in the RAM 402. Then, the CPU 401 calculates a matching rate based on the sum of the numbers of matching characters stored in the RAM 402 (step S1305). In the step S1305, the CPU 401 divides the sum of the numbers of matching characters by the number of characters of the target value candidate. The maximum value of the matching rate is 1.0. Calculation of the matching rate is performed by the following command expressed in a programming language which can use regular expression, such as the Perl language. Note that value_candidate represents a value candidate, and sum_count represents the sum of the numbers of matching characters:

$mach_rate=&sum_count/length (decode ('utf-8', $value_candidate));

$mach_rate=$mach_rate>1.0?1.0: $mach_rate;

The CPU 401 stores the calculated matching rate in the RAM 402 in association with the corresponding value candidate, terminates the matching rate calculation process, and executes a step S1103 in FIG. 11.

Referring again to FIG. 11, the CPU 401 identifies a value candidate having the highest confidence factor based on the position data of the value candidate stored in the RAM 402 and the matching rate (step S1103). In the step S1103, similarly to the step S710, the CPU 401 calculates a distance between the character string area 900 and the value candidate in the page image data item using the position data of the character string area 900 and the position data of the value candidate. The CPU 401 further divides the matching rate corresponding to the value candidate by the calculated distance, and stores a result of the calculation in the RAM 402 as the confidence factor. The CPU 401 calculates the confidence factor with respect to all value candidates, identifies a value candidate having the highest confidence factor, and stores the identified value candidate in the RAM 402. Then, the CPU 401 executes the step S711 et seq.

In the above-described embodiment, a value candidate corresponding to a key candidate is identified based on a matching rate and a distance to a character string corresponding to the key candidate. With this, it is possible to set a character string suitable as a value corresponding to the key candidate, more specifically, a character string which is at a location relatively close to the key candidate and is very high in the matching rate with the value type rule, in the metadata.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-109609, filed Jun. 12, 2019, which is hereby incorporated by reference herein in its entirety.

What is claimed is:

1. An image processing apparatus that sets metadata of image data using one of a plurality of metadata templates, each metadata template associated with a different type of work, comprising:
   at least one memory that stores a program; and
   at least one processor that executes the program to perform:
   selecting a type of work corresponding to the image data;
   performing an optical character recognition (OCR) processing for the image data to obtain character strings corresponding to a plurality of character string areas included in the image data;
   identifying a key candidate from the obtained character strings based on one or more key types defined in a first metadata template of the plurality of metadata templates, the first metadata template corresponding to the selected type of work;
   identifying a value candidate, as a value for the identified key candidate, from the obtained character strings based on a value type rule and a value search area rule defined for a key type of the identified key candidate, wherein the value type rule is a rule for identifying a character string of a specific type from the obtained character strings, and wherein the value search area rule defines a distance between a character string area corresponding to the identified key candidate and a character string area corresponding to the value candidate to be identified; and
   setting the identified value candidate as the metadata of the image data.

2. The image processing apparatus according to claim 1, wherein the value type rule is expressed by regular expression.

3. The image processing apparatus according to claim 1, wherein the at least one processor executes the program to further perform calculating a matching rate of each of the obtained character strings with the value type rule, and
   wherein the value candidate corresponding to the identified key candidate is identified based on the calculated matching rate and a distance to the identified key candidate.

4. A method for setting metadata of image data using one of a plurality of metadata templates, each metadata template associated with a different type of work, comprising:
   selecting a type of work corresponding to the image data;
   performing an optical character recognition (OCR) processing for the image data to obtain character strings corresponding to a plurality of character string areas included in the image data;
   identifying a key candidate from the obtained character strings based on one or more key types defined in a first metadata template of the plurality of metadata templates, the first metadata template corresponding to the selected type of work;
   identifying a value candidate, as a value for the identified key candidate, from the obtained character strings based on a value type rule and a value search area rule defined for a key type of the identified key candidate, wherein the value type rule is a rule for identifying a character string of a specific type from the obtained character strings, and wherein the value search area rule defines a distance between a character string area corresponding to the identified key candidate and a character string area corresponding to the value candidate to be identified; and
   setting the identified value candidate as the metadata of the image data.

5. A non-transitory computer-readable storage medium storing a computer-executable program for causing a computer to perform a method for setting metadata of image data using one of a plurality of metadata templates, each metadata template associated with a different type of work, the method comprising:
   selecting a type of work corresponding to the image data;
   performing an optical character recognition (OCR) processing for the image data to obtain character strings corresponding to a plurality of character string areas included in the image data;
   identifying a key candidate from the obtained character strings based on one or more key types defined in a first metadata template of the plurality of metadata templates, the first metadata template corresponding to the selected type of work;
   identifying a value candidate, as a value for the identified key candidate, from the obtained character strings based on a value type rule and a value search area rule defined for a key type of the identified key candidate, wherein the value type rule is a rule for identifying a character string of a specific type from the obtained character strings, and wherein the value search area rule defines a distance between a character string area corresponding to the identified key candidate and a character string area corresponding to the value candidate to be identified; and
   setting the identified value candidate as the metadata of the image data.

* * * * *